United States Patent [19]
Smith

[11] Patent Number: 6,028,882
[45] Date of Patent: Feb. 22, 2000

[54] CLAUS UNIT COOLING AND HEAT RECOVERY SYSTEM

[76] Inventor: Strom W. Smith, 18502 Cherrytree, Houston, Tex. 77084

[21] Appl. No.: 09/211,324

[22] Filed: Dec. 15, 1998

Related U.S. Application Data

[60] Provisional application No. 60/069,928, Dec. 17, 1997.

[51] Int. Cl.[7] .................. F27D 9/00; F27D 1/00; F27D 1/12
[52] U.S. Cl. .................. 373/113; 373/76; 110/336; 432/233
[58] Field of Search .................. 373/56, 71–76, 373/113, 137, 158, 165; 110/336; 266/194; 432/233, 234, 238

[56] References Cited

U.S. PATENT DOCUMENTS

| | | | |
|---|---|---|---|
| 4,235,173 | 11/1980 | Sharp | 110/336 |
| 4,443,188 | 4/1984 | Bühler | 432/233 |
| 4,715,042 | 12/1987 | Heggart et al. | 373/74 |

*Primary Examiner*—Tu Ba Hoang
*Attorney, Agent, or Firm*—Keeling Law Firm

[57] ABSTRACT

A cooling and heat recovery system for chemical processing vessels. An inner vessel is located within an outer vessel, defining a gap between the two vessels. A heat removal agent is pumped in and out of the gap thereby cooling the wall of the inner vessel which is exposed to exceedingly high temperatures within its interior. Baffling is provided within the gap to ensure the uniform and continuous flow of heat removal agent within the gap. The design of the system increases the rate and efficiency at which heat is transferred from the inner vessel wall to the heat removal agent. In one embodiment, at least one helical bar attached to the inner vessel wall enhances the heat transfer rate and efficiency. Each helical bar generates turbulent flow of the heat removal agent, which in turn enhances the heat transfer between the inner vessel wall and the heat removal agent. This cooling and heat recovery system may be used as a part of a larger heat recovery cycle in a system that uses a heat utilization stage, a cooling stage, and a surge tank.

18 Claims, 5 Drawing Sheets

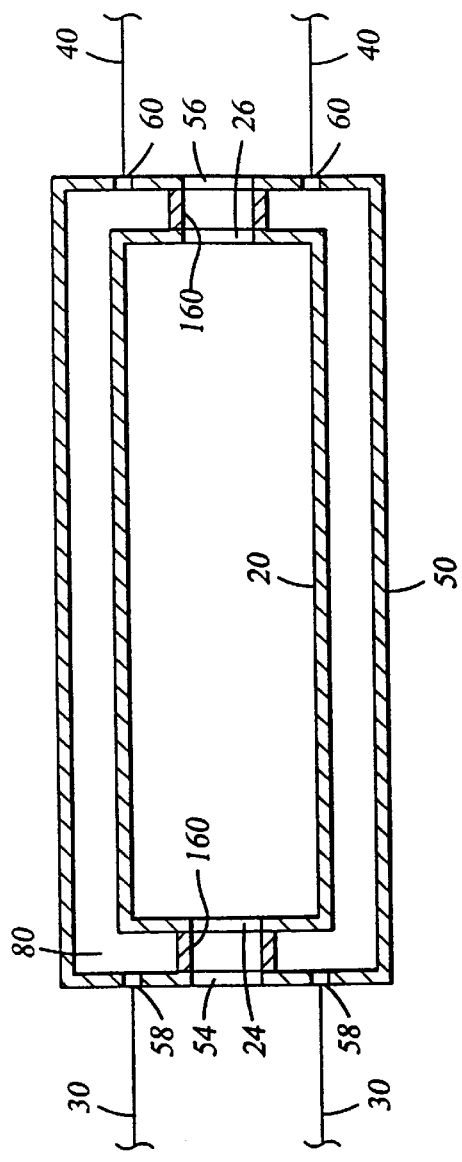
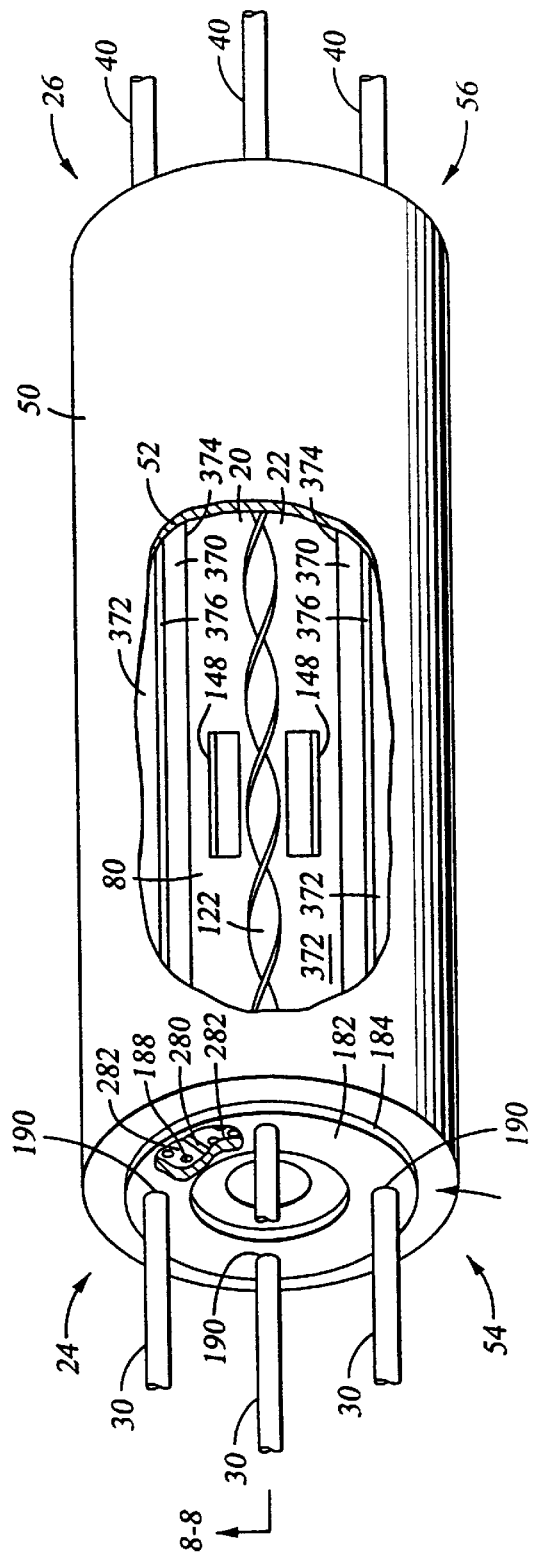
Fig. 8
Fig. 9

CLAUS UNIT COOLING AND HEAT RECOVERY SYSTEM

This application claims benefit of Provisional Application 60/069,928 filed Dec. 17, 1997.

BACKGROUND OF THE INVENTION

1. Field of Invention

This invention relates generally to a system and method for cooling the walls of industrial vessels which, through their use, are exposed to extremely high temperatures. Specifically, this invention is a means for cooling Claus units, the vessels used to produce elemental sulfur by burning hydrogen sulfide in conjunction with air and/or oxygen. Moreover, this invention relates to an improved heat recovery system for use with Claus units, sulfur recovery systems, and industrial plants.

2. Related Art

Different methods for cooling industrial vessels, such as furnaces, that are exposed to extremely high temperatures are known to the prior art. Illustrative of such methods are U.S. Pat. No. 4,235,173 issued to Sharp, U.S. Pat. No. 4,443,188 issued to Buhler, and U.S. Pat. No. 4,715,042 issued to Heggart et al. Each of the methods disclosed in the patents utilizes a liquid cooling means; however, each of the listed prior art methods is structurally constrained, functions differently than the present invention, and would not be easily applied to a Claus unit.

Like many industrial vessels, Claus units are exposed to extremely high temperatures through their use and during their life. Normal temperatures in a Claus unit can range from 2700° F. to 3000° F. Such extreme temperatures are usually high enough to melt the vessel walls. Needless to say, such an outcome presents a grave danger to workers within the industrial plant and may be catastrophic to the industrial plant which utilizes the vessel.

Thus, providing a cooling means which maintains the interior of the Claus unit at the required high temperature while cooling the walls of the unit to an adequate and safe level is beneficial to the prior art.

Prior art cooling means consist primarily of refractory lining attached to the interior of the Claus unit. The refractory lining insulates the walls of the unit from the extreme temperatures in the interior of the unit.

Unfortunately, the refractory lining thickness required to maintain adequate and safe temperatures in a Claus unit can be as thick as 15 inches and is very costly. The large thickness of the lining also substantially reduces the area available for use within the vessel. In addition, costly and sophisticated instrumentation is required to monitor the temperatures of the vessel and the refractory lining. Moreover, the refractory lining itself may melt if the temperature in the interior of the unit reaches a high enough level through human or mechanical error.

The use of refractory lining as a means to cool a vessel also has other disadvantages: the usable life of the vessel is reduced since heat radiates from the lining back into the vessel exposing the interior of the vessel to excess heat; the vessel may not be quickly activated or deactivated since refractory lining thermal stress then becomes a concern; and the vessel may not be quickly serviced since the refractory lining must be given a substantial amount of time to cool down prior to service.

Thus, it would be beneficial to provide a means for cooling a Claus unit which does not encounter the disadvantages of the use of refractory lining as herein stated.

In addition, as extensively practiced in the art, Claus units are normally only a part or sub-process of the overall process of an industrial plant. Normally, Claus units are utilized within industrial plants to produce elemental sulfur from gases, primarily hydrogen sulfide, that are by-products of the plants's overall process or other sub-processes. Most, if not all, of industrial plants utilize extensive and varied raw or input materials in a number of sub-processes within the overall industrial plant process. Efficient industrial plants utilize the by-products or end products of one sub-process as the raw or input materials of other sub-processes. For example, an efficient industrial plant may utilize a relatively high temperature by-product gas of one sub-process to heat an otherwise relatively cold material which requires a higher temperature for use in its relevant sub-process.

Thus, it would also be beneficial to provide a Claus unit cooling means which produces a by-product or end-product useful within the Claus process itself or elsewhere within the industrial plant process.

SUMMARY OF THE INVENTION

Accordingly, the objectives of this invention are to provide, inter alia, a cooling and heat recovery system that:

maintains the interior of vessels at the required high operating temperature while cooling the walls of the vessel to an adequate and safe level;

is designed specifically to cool Claus units;

does not encounter the disadvantages of the use of refractory lining;

produces a by-product or end-product useful within the vessel itself or elsewhere within the industrial plant process; and includes a means for enhancing heat transfer which increases the rate and efficiency of the cooling process.

Other objects of the invention will become apparent from time to time throughout the specification hereinafter disclosed.

To achieve such improvements, my invention is a cooling and heat recovery system comprising an inner vessel located within an outer vessel, defining a gap therebetween. A heat removal agent is pumped in and out of the gap thereby cooling the wall of the inner vessel which is exposed to exceedingly high temperatures within its interior. Means for baffling is provided within the gap to ensure the uniform and continuous flow of heat removal agent within the gap. In addition, a means for enhancing heat transfer is provided which increases the rate and efficiency at which heat is transferred from the inner vessel wall to the heat removal agent. In one embodiment, means for enhancing heat transfer comprises at least one helical bar attached to the inner vessel wall. Each helical bar generates turbulent flow of the heat removal agent which, in turn, enhances the heat transfer between the inner vessel wall and the heat removal agent. Cooling and heat recovery system may further be a part of a larger heat recovery cycle comprising the system together with a heat utilization stage, a cooling stage, and a surge tank.

BRIEF DESCRIPTION OF THE DRAWINGS

FIG. 8 is a cross-sectional elevational view of the alternative preferred embodiment of the system, not including first and second baffle reservoirs; the cross-section taken along line 8—8 of FIG. 9.

FIG. 9 is an isometric partially cut-away view of the alternative preferred embodiment of the system, including longitudinal flow separators and longitudinal flow sections.

DETAILED DESCRIPTION OF THE INVENTION

Figure 1:
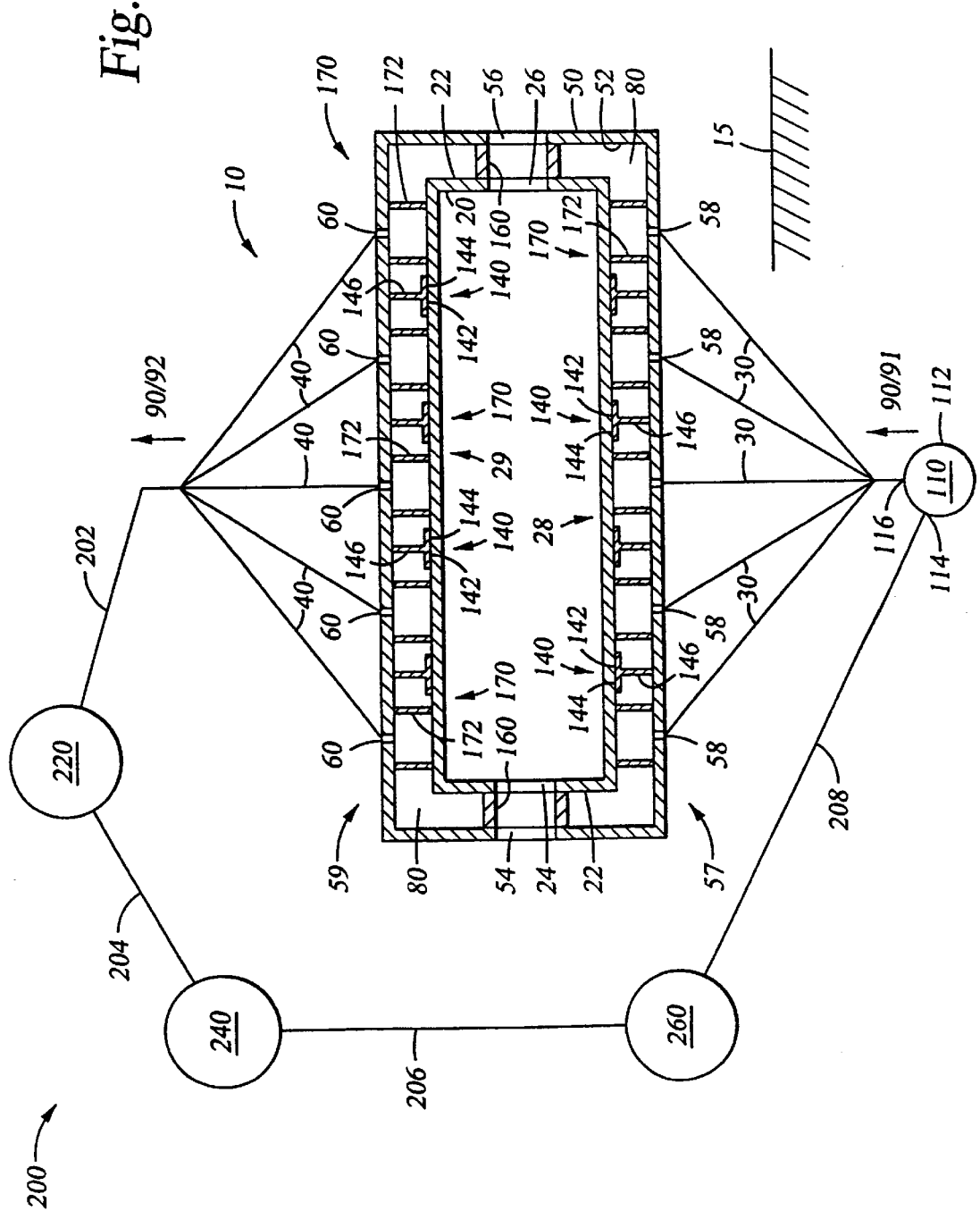
FIG. 1 is a cross-sectional elevational view of the system, not including first or second baffle reservoirs or helical bars, within a larger heat recovery cycle; the cross-section taken along line 1—1 of FIG. 7.

The cooling and heat recovery system is depicted generally as 10 and is shown in FIGS. 1–9. The cooling and heat recovery system 10 generally comprises an inner vessel 20, an outer vessel 50, a gap 80, a means for pumping 110, a means for spacing 140, and preferably a means for enhancing 120 the heat transfer rate (see FIG. 2). Outer vessel 50 surrounds inner vessel 20. Means for spacing 140 defines and maintains gap 80 intermediate outer vessel 50 and inner vessel 20. Means for pumping 110 pumps a liquid heat removal agent 90 in and out of gap 80. Means for enhancing 120 enhances the heat transfer from the relatively hotter inner vessel 20 to the relatively cooler heat removal agent 90.

Heat removal agent 90 generally comprises a fluid possessing a high heat transfer coefficient and having an unusually high boiling point. Such agents 90 are widely known in the art and include DOWTHERM A and SYLTHERM manufactured by Dow Chemical Company. In another embodiment, heat removal agent 90 comprises water.

Turning to FIG. 1, inner vessel 20 generally comprises an inner vessel wall 22, an inner vessel entrance 24, and an inner vessel exit 26. When system 10 is applied to Claus units, inner vessel 20 generally corresponds to the Claus unit, excluding the refractory lining. Therefore, inner vessel 20 generally has the same size and cylindrical shape as standard Claus units. It is understood, however, that the cooling and heat recovery system 10 can be utilized on any vessel, and that the shape of inner vessel 20 depends on the application for which it is utilized.

In Claus units, as the Figures illustrate, and in many other inner vessels 20 having a cylindrical shape, inner vessel entrance 24 is located on one of the circular ends of the cylindrical shape, and inner vessel exit 26 is located on the other circular end of the cylindrical shape. Moreover, for purposes of description and clarity, all inner vessels 20 may be divided into a bottom portion 28, which is proximate the ground 15 on which the vessel rests, and a top portion 29, which is distal ground 15.

Inner vessel 20, including inner vessel wall 22, must be resistant to high temperatures. Preferably, inner vessel 20 is constructed from an alloy steel material, such as 310 stainless steel.

Outer vessel 50 generally comprises an outer vessel wall 52, an outer vessel entrance 54, and an outer vessel exit 56. Outer vessel 50 is larger than inner vessel 20, and inner vessel 20 is located within outer vessel 50. Thus, outer vessel 50 completely surrounds inner vessel 20 and gap 80 is defined therebetween. Preferably, outer vessel 50 comprises the same shape as inner vessel 20.

In the preferred embodiment, inner vessel 20 is situated within outer vessel 50 so that inner vessel entrance 24 is proximate and adjacent to outer vessel entrance 54 and so that inner vessel exit 26 is proximate and adjacent to outer vessel exit 56. Preferably, in Claus units and in other cylindrically shaped inner vessels 20, inner vessel entrance 24 and outer vessel entrance 54 are concentrically aligned, and inner vessel exit 26 and outer vessel exit 56 are also concentrically aligned.

For purposes of clarity and description, all outer vessels 50 may be divided into a bottom portion 57, which corresponds to inner vessel bottom portion 28, and a top portion 59, which corresponds to inner vessel top portion 29.

Outer vessel 50, including outer vessel wall 52, must be resistant to high temperatures. Preferably, outer vessel 50 is constructed from an alloy steel or carbon steel material. In the preferred embodiment, outer vessel 50 and inner vessel 20 are constructed from the same material. Thus, in this preferred embodiment, each vessel, 20 and 50, has the same coefficient of thermal expansion. The stresses normally associated with two different coefficients of thermal expansion in functionally related parts are therefore alleviated in the preferred system 10.

Outer vessel 50 and inner vessel 20 are sealed together at their respective entrances, 24 and 54, and exits, 26 and 56. Thus, gap 80 is sealed from the exterior of the system 10. Preferably, outer vessel 50 and inner vessel 20 are sealed by an annular section 160, one at their respective entrances, 24 and 54, and one at their respective exits, 26 and 56.

Figure 2:
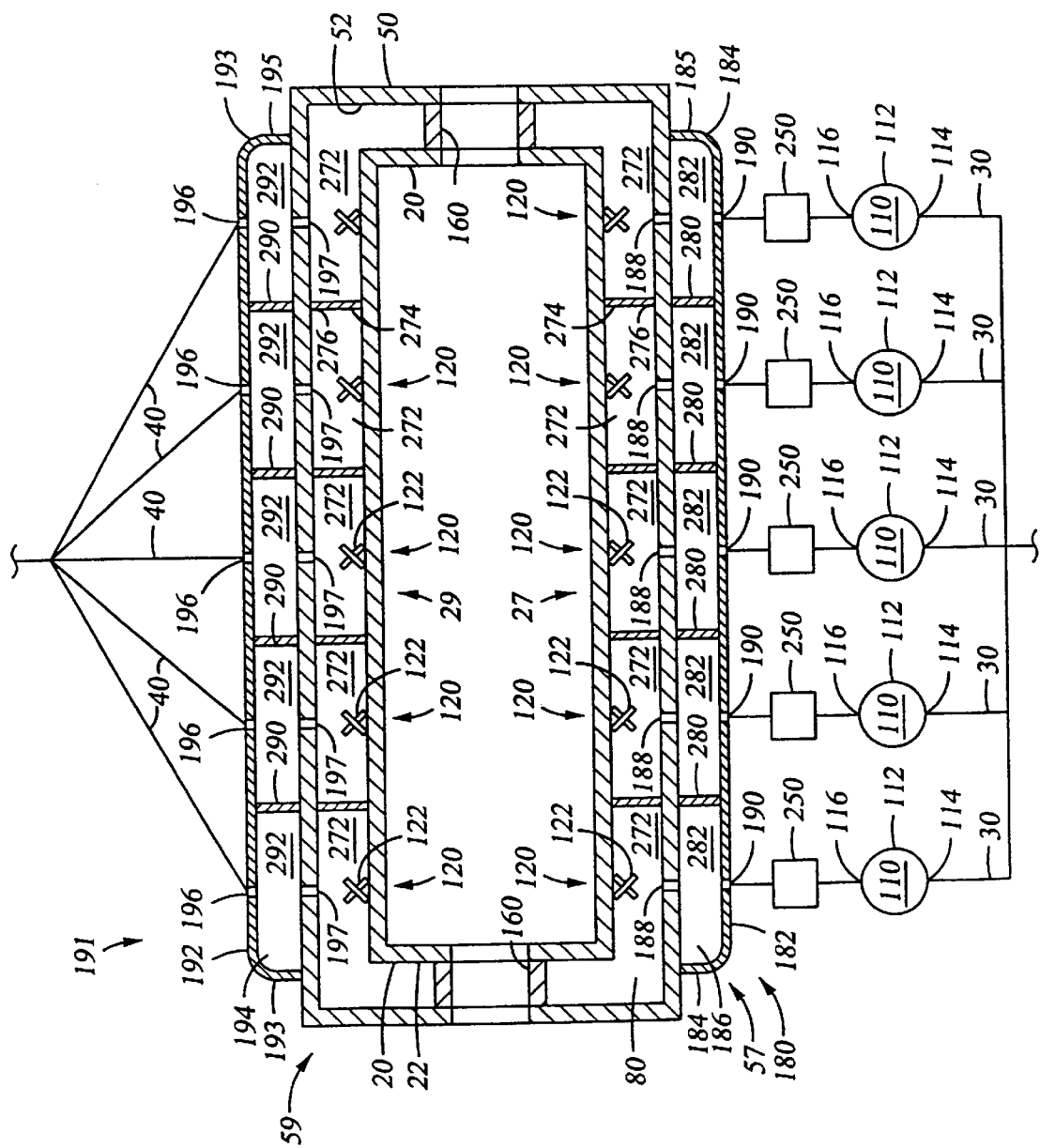
FIG. 2 is a cross-sectional elevational view of the system, including first and second baffle reservoirs and flow regulators; the cross-section taken along line 2—2 of FIG. 7.
Figure 7:
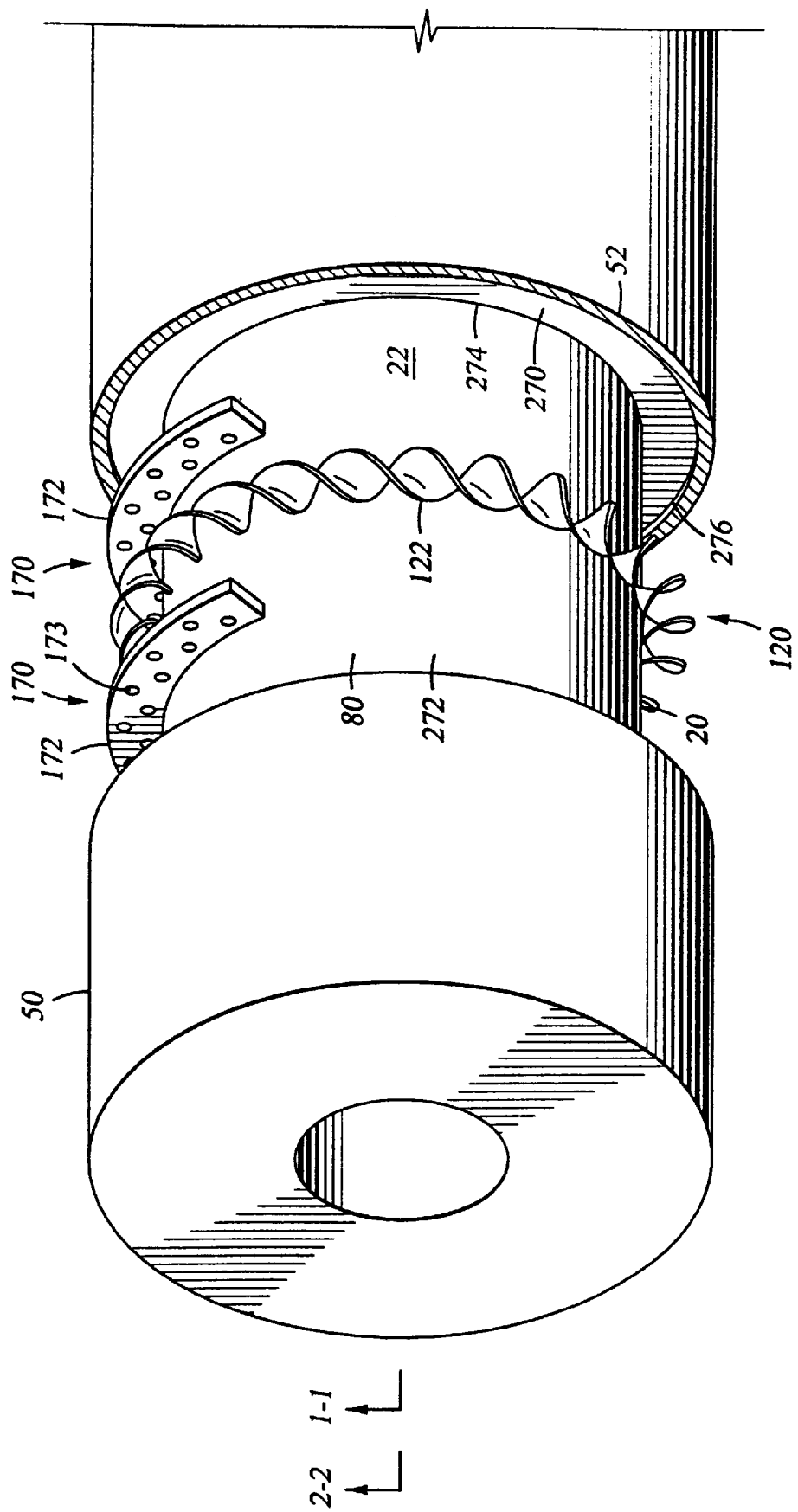
FIG. 7 is a partial isometric partially cut-away view of the system, including transverse flow separators and transverse flow sections.

In the preferred embodiment and as shown in FIGS. 2 and 7, heat recovery system 10 comprises a plurality of transverse flow separators 270 which divide gap 80 into a plurality of transverse flow sections 272. Each transverse flow separator 270 includes two ends, a first end 274 and a second end 276. Each transverse flow separator first end 274 is fixedly attached to the inner vessel wall 22. Each transverse flow separator second end 276 is fixedly attached to the outer vessel wall 52. In addition, each transverse flow separator 270 extends along the entire circumference of inner vessel 20 thereby completely encircling inner vessel 20 (see FIG. 7).

The transverse flow separators 270 are attached along the lengths of inner vessel 20 and outer vessel 50. Preferably, the plurality of transverse flow separators 270 are equally dispersed along the longitudinal lengths of inner vessel 20 and outer vessel 50. The transverse flow separators 270, as previously detailed, create a plurality of transverse flow sections 272, each having an annular cross-sectional shape. In one embodiment, the plurality of transverse flow sections 272 are sealed from each other so that the heat removal agent 90 flowing in one transverse flow section 272 does not pass into any other transverse flow section 272. In another embodiment (not shown), the plurality of transverse flow sections 272 are in fluid communication with each other thereby enabling the passage of heat removal agent 90 between transverse flow sections 272. In this embodiment, each transverse flow separator 270 includes a plurality of apertures (not shown) therethrough which provide direct fluid communication between either side of the corresponding transverse flow separator 270.

Figure 3:
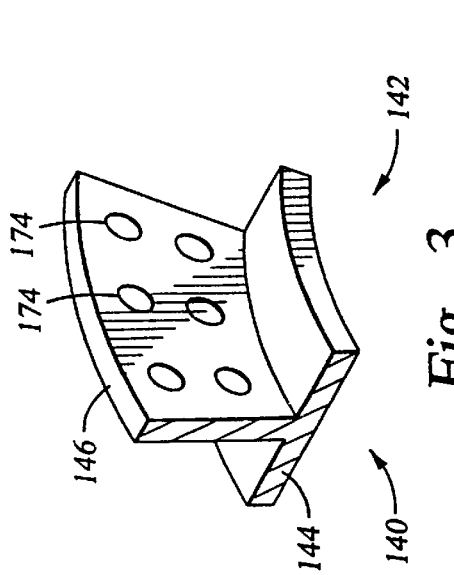
FIG. 3 is an isometric view of one embodiment of the means for spacing.
Figure 4:
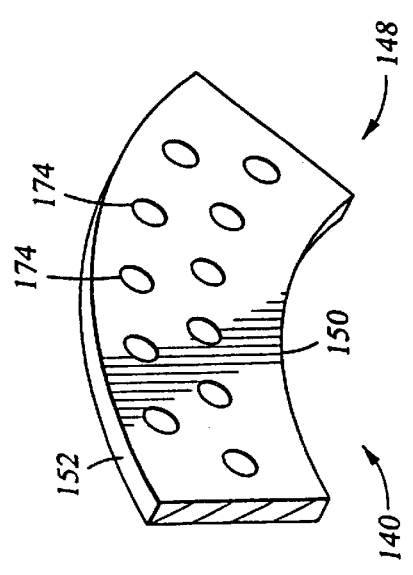
FIG. 4 is an isometric view of a second embodiment of the means for spacing.

As best seen in FIGS. 1, 3, and 4, cooling and heat recovery system 10 further comprises a means for spacing 140. Means for spacing 140 provides for and maintains a gap 80 between inner vessel 20 and outer vessel 50. In the preferred embodiment, means for spacing 140 provides for and maintain gap 80 between inner vessel 20 and outer vessel 50 so that the length of gap 80 is uniform throughout the configuration and shape of inner vessel 20 and outer vessel 50. Furthermore, as will be disclosed herein, means for spacing 140 alleviates some of the stress created on inner vessel 20 by the flow of heat removal agent 90.

In the embodiment including transverse flow separators 270 (or longitudinal flow separators 370, as will be defined herein), means for spacing 140 comprises the plurality of transverse flow separators 270 (or longitudinal flow separators 370). In another embodiment (see FIGS. 1 and 3), means for spacing 140 comprises a plurality of brackets 142. Each bracket 142 includes two ends, a first end 144 and a second end 146. Each bracket first end 144 is fixedly attached to the inner vessel wall 22. Each bracket second end 146 is fixedly attached to the outer vessel wall 52. In another embodiment (see FIGS. 4 and 9), means for spacing 140 comprises a plurality of rod members 148. Each rod member 148 includes two ends, a first end 150 and a second end 152. Each rod first end 150 is fixedly attached to the inner vessel wall 22. Each rod second end 152 is fixedly attached to the outer vessel wall 52. It is understood that, in comprising means for spacing 140, system 10 may include any combination of transverse flow separators 270 (or longitudinal flow separators 370), brackets 142, and/or rod members 148.

Cooling and heat recovery system 10 further preferably comprises a means for baffling 170. Means for baffling 170 allows and directs the flow of heat removal agent 90 within gap 80. Furthermore, means for baffling 170 aids in providing a uniform flow of heat removal agent 90 within gap 80.

In one embodiment, means for baffling 170 comprises the plurality of brackets 142, rod members 148, and/or transverse flow separators 270 (or longitudinal flow separators 370) comprising means for spacing 140. In this embodiment, each means for spacing 140 component is preferably elongate. In one embodiment, each means for spacing 140 component includes a plurality of apertures 174 extending therethrough so as to provide direct fluid communication between either side of the corresponding means for spacing 140 component.

In another embodiment as shown in FIGS. 1 and 7, means for baffling 170 comprises a plurality of baffle plates 172 fixedly attached within gap 80. In one embodiment, each baffle plate 172 is fixedly attached at one end to the outer vessel wall 52 and at another end to the inner vessel wall 22. Preferably, each baffle plate 172 also includes a plurality of apertures 173 extending therethrough so as to provide direct fluid communication between either side of the corresponding baffle plate 172.

Figure 5:
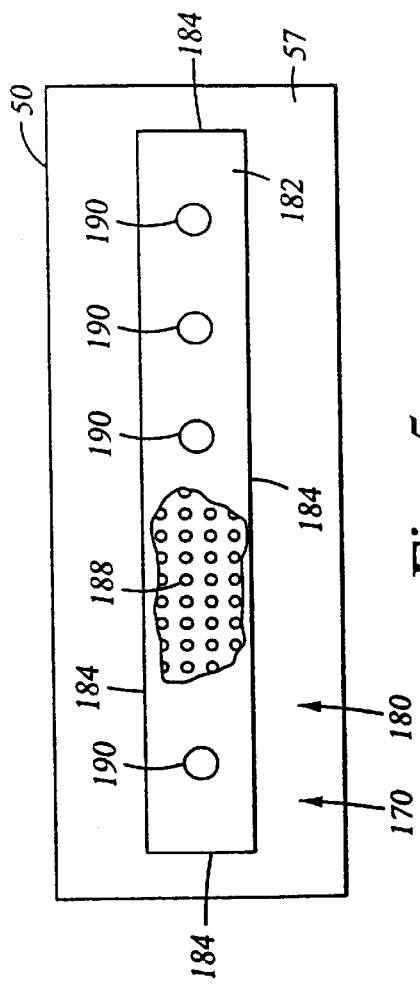
FIG. 5 is a bottom partially cut-away view of the system, including first baffle reservoir.

In the preferred embodiment as shown in FIGS. 2 and 5, means for baffling 170 further comprises a first baffle reservoir 180. First baffle reservoir 180 is sealingly attached preferably to outer vessel bottom portion 57. First baffle reservoir 180 includes a first reservoir surface 182 and first reservoir walls 184, defining a first reservoir interior 186 therebetween. Each first reservoir wall 184 includes an attachment end 185 distal to first reservoir surface 182. Each first reservoir wall 184 is sealingly attached, at its attachment end 185 and by well-known methods such as welding, to outer vessel bottom portion 57. It is preferable that first baffle reservoir 180 be sealingly attached to outer vessel 50. Preferably, in order to provide such sealing attachment, the shape and configuration of first baffle reservoir 180 and its walls 184 is such that it mirrors and complements the shape and configuration of outer vessel 50 at the attachment location.

In the preferred embodiment, first baffle reservoir 180 is elongate in shape, having a relatively smaller width, and extending along the majority of the longitudinal length of outer vessel 50. In the preferred embodiment, first baffle reservoir 180 comprises one-half of a closed-end tube cut down its length.

First baffle reservoir 180 includes at least one first baffle reservoir opening 190 extending through first baffle reservoir surface 182. Each first baffle reservoir opening 190 provides fluid communication between first baffle reservoir interior 186 and the exterior of first baffle reservoir 180. In the preferred embodiment, at least one first baffle reservoir opening 190 comprises a plurality of first baffle reservoir openings 190 preferably dispersed along the length of first baffle reservoir surface 182.

In this preferred embodiment, outer vessel 50 includes at least one outer vessel inlet 188 on the section of outer vessel wall 52 covered by and directly adjacent to first baffle reservoir 180. Each outer vessel inlet 188 extends through outer vessel wall 52. Thus, each outer vessel inlet 188 provides fluid communication between gap 80 and reservoir interior 186.

In the embodiment including transverse flow sections 272, first baffle reservoir 180 further preferably includes a plurality of first baffle separators 280 separating first baffle reservoir 180 into a plurality of first baffle reservoir sections 282. In this embodiment, each first baffle reservoir section 282 is in fluid communication with preferably only one transverse flow section 272. In addition, it is preferred that the first baffle reservoir sections 282 be sealed from each other.

Figure 6:
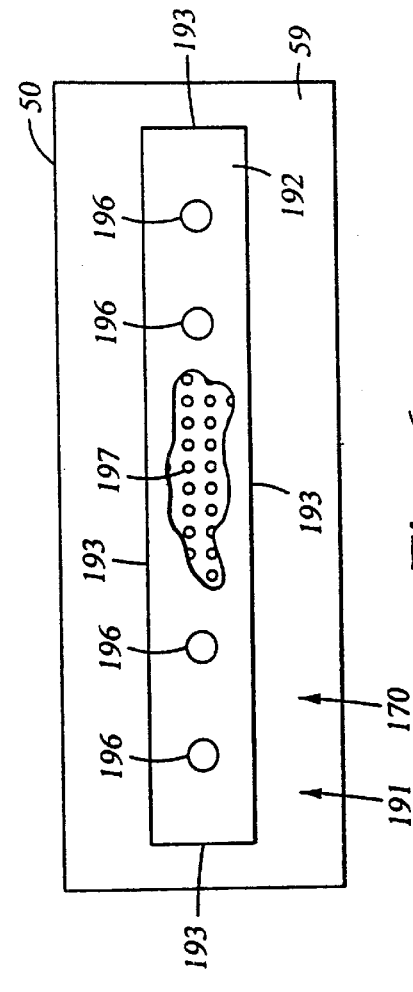
FIG. 6 is a top partially cut-away view of the system, including second baffle reservoir.

In the preferred embodiment and as shown in FIGS. 2 and 6, in addition to including first baffle reservoir 180, means for baffling 170 also comprises a second baffle reservoir 191 attached to outer vessel 50. Second baffle reservoir 191 is sealingly attached preferably to outer vessel top portion 59. Second baffle reservoir 191 includes a second reservoir surface 192 and second reservoir walls 193, defining a second reservoir interior 194 therebetween. Each second reservoir wall 193 includes an attachment end 195 distal to second reservoir surface 192. Each second reservoir wall 193 is sealingly attached, at its attachment end 195 and by well-known methods such as welding, to outer vessel top portion 59. It is preferable that second baffle reservoir 191 be sealingly attached to outer vessel 50. Preferably, in order to provide such sealing attachment, the shape and configuration of second baffle reservoir 191 and its walls 193 is such that it mirrors and complements the shape and configuration of outer vessel 50 at the attachment location.

In the preferred embodiment, second baffle reservoir 191 is elongate in shape, having a relatively smaller width, and extending along the majority of the longitudinal length of outer vessel 50. In the preferred embodiment, second baffle reservoir 191 comprises one-half of a closed-end tube cut down its length.

Second baffle reservoir 191 includes at least one second baffle reservoir opening 196 extending through second baffle reservoir surface 192. Each second baffle reservoir opening 196 provides fluid communication between second baffle reservoir interior 194 and the exterior of second baffle reservoir 191. In the preferred embodiment, at least one second baffle reservoir opening 196 comprises a plurality of second baffle reservoir openings 196 preferably dispersed along the length of second baffle reservoir surface 192.

In this preferred embodiment, outer vessel 50 includes at least one outer vessel outlet 197 on the section of outer vessel wall 52 covered by and directly adjacent to second baffle reservoir 191. Each outer vessel outlet 197 extends through outer vessel wall 52. Thus, each outer vessel outlet 197 provides fluid communication between gap 80 and second reservoir interior 194.

In the embodiment including transverse flow sections 272, second baffle reservoir 191 further preferably includes a plurality of second baffle separators 290 separating second baffle reservoir 191 into a plurality of second baffle reservoir sections 292. In this embodiment, each second baffle reservoir section 292 is in fluid communication with preferably only one transverse flow section 272. In addition, it is preferred that the second baffle reservoir sections 292 be sealed from each other.

Cooling and heat recovery system 10 further preferably comprises at least one inflow conduit 30 and at least one outflow conduit 40. Each inflow conduit 30 and outflow conduit 40 comprises normal piping, well-known in the art, capable of holding heat removal agent 90 at its different temperatures.

In the embodiment shown in FIG. 1 not including first baffle reservoir 180, outer vessel 50 includes one outer vessel inflow conduit opening 58 corresponding to each inflow conduit 30. Each outer vessel inflow conduit opening 58 extends through outer vessel wall 52 and is in fluid communication with gap 80. In this embodiment, each inflow conduit 30 is in fluid communication with its corresponding outer vessel inflow conduit opening 58. Thus, each inflow conduit 30 is in fluid communication with gap 80. Also in this embodiment, each inflow conduit 30 is preferably selectively removably attached, such as by threading, to its corresponding outer vessel inflow conduit opening 58.

In the embodiment including a plurality of transverse flow sections 272, outer vessel 50 includes at least one vessel inflow conduit opening 58 in fluid communication with each transverse flow section 272. Thus, in this embodiment, each inflow conduit 30 feeds only one transverse flow section 272.

In the embodiment shown in FIG. 1 not including second baffle reservoir 191, outer vessel 50 includes one outer vessel outflow conduit opening 60 corresponding to each outflow conduit 40. Each outer vessel outflow conduit opening 60 extends through outer vessel wall 52 and is in fluid communication with gap 80. In this embodiment, each outflow conduit 40 is in fluid communication with its corresponding outer vessel outflow conduit opening 60. Thus, each outflow conduit 40 is in fluid communication with gap 80. Also in this embodiment, each outflow conduit 40 is preferably selectively removably attached, such as by threading, to its corresponding outer vessel outflow conduit opening 60.

In the embodiment including a plurality of transverse flow sections 272, outer vessel 50 includes at least one outer vessel outflow conduit opening 60 in fluid communication with each transverse flow section 272. Thus, in this embodiment, each outflow conduit 40 is connected to and in fluid communication with only one transverse flow section 272.

Preferably, vessel inflow conduit opening(s) 58 and vessel outflow conduit opening(s) 60 are located on opposite sides of outer vessel 50. In the preferred embodiment, vessel inflow conduit opening(s) 58 are located on outer vessel bottom portion 57 and vessel outflow conduit openings 60 are located on outer vessel top portion 59.

In the embodiment including first baffle reservoir 180 as shown in FIG. 2, outer vessel 50 does not include any outer vessel inflow conduit openings 58. Instead, outer vessel 50 includes, as previously disclosed, a plurality of outer vessel inlets 188, and first baffle reservoir 180 includes a plurality of first baffle reservoir openings 190. Each first baffle reservoir opening 190 corresponds to one inflow conduit 30. In this embodiment, each inflow conduit 30 is in fluid communication with its corresponding first baffle reservoir opening 190. Thus, each inflow conduit 30 is in fluid communication with first baffle reservoir interior 186 and in turn with gap 80 through outer vessel inlets 188. Also in this embodiment, each inflow conduit 30 is preferably selectively removably attached, such as by threading, to its corresponding first baffle reservoir opening 190.

In the preferred embodiment including a plurality of transverse flow sections 272, outer vessel 50 includes at least one outer vessel inlet 188 in fluid communication with each transverse flow section 272. Thus, in this embodiment, each transverse flow section 272 is in fluid communication with first baffle reservoir interior 186 through different outer vessel inlets 188. Further, in this embodiment, at least one inflow conduit 30 feeds each first baffle reservoir section 282 (and each first baffle reservoir section 282 is in fluid communication with one transverse flow section 272).

In the embodiment including second baffle reservoir 191 as shown in FIG. 2, outer vessel 50 does not include any outer vessel outflow conduit openings 60. Instead, outer vessel 50 includes, as previously disclosed, a plurality of outer vessel outlets 197, and second baffle reservoir 191 includes a plurality of second baffle reservoir openings 196. Each second baffle reservoir opening 196 corresponds to one outflow conduit 40. In this embodiment, each outflow conduit 40 is in fluid communication with its corresponding second baffle reservoir opening 196. Thus, each outflow conduit 40 is in fluid communication with second baffle reservoir interior 194 and in turn with gap 80 through outer vessel outlets 197. Also in this embodiment, each outflow conduit 40 is preferably selectively removably attached, such as by threading, to its corresponding second baffle reservoir opening 196.

In the preferred embodiment including a plurality of transverse flow sections 272, outer vessel 50 includes at least one outer vessel outlet 197 in fluid communication with each transverse flow section 272. Thus, in this embodiment, each transverse flow section 272 is in fluid communication with second baffle reservoir 191 through different outer vessel outlets 197. Further, in this embodiment, at least one outflow conduit 40 is in fluid communication with each second baffle reservoir section 292 (and each second baffle reservoir section 292 is in fluid communication with one transverse flow section 272).

In the preferred embodiment, outer vessel 50 includes a plurality of outer vessel inflow conduit openings 58 (or outer vessel inlets 188 in the embodiment including first baffle reservoir 180). Also preferably, the plurality of inflow conduit openings 58 (or outer vessel inlets 188 in the embodiment including first baffle reservoir 180) are equally spaced longitudinally along the length of outer vessel 50 (or first reservoir bottom 182 in the embodiment including first baffle reservoir 180) thereby ensuring the uniformity of flow of heat removal agent 90 within gap 80 or each transverse flow section 272 (in the relevant embodiment). The equal spacing of the inflow conduit openings 58 (or outer vessel inlets 188 in the embodiment including first baffle reservoir 180) also aids in maximizing the area of inner vessel wall 22 which comes into contact with heat removal agent 90 at its initial temperature 91.

In the preferred embodiment, outer vessel 50 also includes a plurality of outer vessel outflow conduit openings 60 (or outer vessel outlets 197 in the embodiment including second baffle reservoir 191). Also preferably, the plurality of outflow conduit openings 60 (or outer vessel outlets 197 in the embodiment including second baffle reservoir 191) are equally spaced longitudinally along the length of outer vessel 50 (or second reservoir bottom 182 in the embodiment including second baffle reservoir 191) thereby ensuring the uniformity of the outflow rate of heat removal agent 90 from gap 80 or each transverse flow section 272 (in the relevant embodiment).

In the preferred embodiment, outer vessel 50 includes an equal number of inflow conduit openings 58 (or outer vessel inlets 188 in the embodiment including first baffle reservoir 180) and outflow conduit openings 60 (or outer vessel outlets 197 in the embodiment including second baffle reservoir 191). In one embodiment, the cross-sectional diameters of the inflow conduit openings 58 (or outer vessel inlets 188 in the embodiment including first baffle reservoir 180) and outflow conduit openings 60 (or outer vessel outlets 197 in the embodiment including second baffle reservoir 191) are substantially equal, and the cross-sectional diameters of the inflow conduits 30 and the outflow conduits 40 are substantially equal.

In the preferred embodiment as shown in FIGS. 2 and 7, cooling and heat recovery system 10 further comprises a means for enhancing heat transfer 120. Means for enhancing heat transfer 120 enhances the rate of heat transfer between the relatively hotter inner vessel wall 22 and the relatively cooler heat removal agent 90.

In the preferred embodiment, means for enhancing heat transfer 120 comprises at least one helical bar 122. Each helical bar 122 is elongate. In one preferred embodiment, each helical bar 122 has a cross-sectional area with a rectangular shape. In another preferred embodiment, each helical bar 122 has a cross-sectional area in a non-circular shape, such as an "X" or a "Y" shape.

Furthermore, each helical bar 122, regardless of its cross-sectional shape, is twisted along its longitudinal axis so as to form the well-known helical shape.

By attachment methods well-known in the art, such as welding or tacking, each helical bar 122 is fixedly attached to the inner vessel wall 22. Necessarily, the overall length of each helical bar 122 is configured and shaped so as to allow fixed attachment to inner vessel wall 22. For example, if inner vessel wall 22 is cylindrical in shape, then the overall length of each helical bar 122 is arc-shaped so as to complement and mirror the round shape of inner vessel wall 22 (as shown in FIG. 7). Also in the preferred embodiment, each helical bar 122 is sufficiently long enough to completely encircle inner vessel 20.

In the preferred embodiment, at least one helical bar 122 comprises a plurality of helical bars 122. Preferably, the plurality of helical bars 122 are attached to inner vessel wall 22 so that each helical bar 122 is perpendicular to the direction of the flow of heat removal agent 90 within gap 80, as will be disclosed herein. Also in the preferred embodiment, the plurality of helical bars 122 are equally dispersed attached along the longitudinal length of inner vessel 20. Furthermore, in the embodiment including transverse flow sections 272, at least one helical bar 122 is attached within each transverse flow section 272.

Means for pumping 110 comprises at least one pump 112, such as a standard industry centrifugal pump, capable of pumping heat removal agent 90 into, through, and out of gap 80 between inner vessel 20 and outer vessel 80. Each pump 112 includes a pump inlet 114 and a pump outlet 116. Pump outlet 116 is connected to and in fluid communication with each inflow conduit 30. Pump inlet 114 is connected to and is in fluid communication with fourth piping 208.

In the preferred embodiment as shown in FIG. 2, means for pumping 110 comprises a plurality of pumps 112. In one embodiment, each pump 112, at its pump outlet 116, is connected to and is in fluid communication with one inflow conduit 30. Preferably, in this embodiment, the number of pumps 112 is equal to the number of inflow conduits 30.

In the preferred embodiment as shown in FIG. 2, heat recovery system 10 further comprises a flow regulator 250 on each of the inflow conduits 30. Each flow regulator 250 preferably comprises a variable flow valve 252 connected to an inflow conduit 30, which variable flow valve 252 adjusts or modifies the flow rate of heat removal agent 90 through the relevant inflow conduit 30. It is preferable for the embodiment including a plurality of transverse flow sections 272 (or longitudinal flow sections 372) to include flow regulators 250.

Turning back to FIG. 1, cooling and heat recovery system 10 is further preferably a part of a larger heat recovery cycle 200 in the industrial plant. Heat recovery cycle 200 comprises the cooling and heat recovery system 10 together with a heat utilization stage 220, a cooling stage 240, and a surge tank 260.

First piping 202 connects and provides fluid communication between each outflow conduit 40 and heat utilization stage 220. Second piping 204 connects and provides fluid communication between the heat utilization stage 220 and cooling stage 240. Third piping 206 connects and provides fluid communication between cooling stage 240 and surge tank 260. Fourth piping 208 connects and provides fluid communication between surge tank 260 and means for pumping 110.

Heat utilization stage 220 utilizes the heat possessed and absorbed by heat removal agent 90 after it has passed through gap 80 between inner vessel 20 and outer vessel 50. Prior to entering gap 80, heat removal agent 90 possesses an initial temperature 91 of approximately 200° F. to 300° F. After exiting gap 80 through outflow conduit openings 60 (or outer vessel outlets 197 in the embodiment including second baffle reservoir 191), heat removal agent 90 possesses an exit temperature 92 of approximately 400° F. to 600° F.

Heat utilization stage 220 comprises any function, equipment, or sub-process in the industrial plant which can utilize heat for work, such as a steam generation or a reheating facility. The specific structure and function of heat utilization stage 220 is dependent upon the requirements and desires of the operator. For instance, heat utilization stage 220 may comprise using the relatively high temperature agent 90, at its exit temperature 92, to preheat the sulfur gases (hydrogen sulfide) within the Claus unit prior to their entering the catalytic reactor beds.

Cooling stage 240 cools the heat removal agent 90 after it has passed through the heat utilization stage 220 to its initial temperature 91, the suitable temperature for injection back into cooling and heat recovery system 10. Cooling stage 240 may comprise a natural cooling method, such as a cooling pond or tower, or an artificial cooling method. The specific structure and function of cooling stage 240 is dependent upon the requirements and desires of the operator.

Surge tank 260 holds a quantity of heat removal agent 90 ready to be pumped into cooling and heat recovery system 10 by means for pumping 110. Heat removal agent 90 flows into surge tank 260 after passing through cooling stage 240. Thus, the heat removal agent 90 within surge tank 260 is at initial temperature 91.

It is noted that a number of additional stages that are well-known in industrial plant design may be incorporated into heat recovery cycle 200. The principal condition to the addition of such stages is that the heat removal agent 90 must possess the initial temperature 91 prior to being injected into gap 80.

ALTERNATIVE PREFERRED EMBODIMENT

In an alternative preferred embodiment as shown in FIGS. 8 and 9, cooling and heat recovery system 10 generally comprises inner vessel 20, outer vessel 50, gap 80, at least one inflow conduit 30, at least one outflow conduit 40, and means for pumping 110 as disclosed in the previous embodiment. However, in the alternative preferred embodiment of system 10, the location of inflow conduits 30 and outflow conduits 40 differs from that disclosed in the previous embodiment. Furthermore, instead of including a plurality of transverse flow separators 270 and transverse flow sections 272, the alternative preferred embodiment includes a plurality of longitudinal flow separators 370 and longitudinal flow sections 372. The alternative preferred embodiment is particularly suited for vessels, specially cylindrical vessels, which include a burner (or other heat source) near their entrance or exit, such as a Claus Unit.

In this embodiment, system 10 comprises a plurality of longitudinal flow separators 370 which divide gap 80 into a plurality of longitudinal flow sections 372. Each longitudinal flow separator 370 includes two ends, a first end 374 and a second end 376. Each longitudinal flow separator first end 374 is fixedly attached to the inner vessel 22. Each longitudinal flow separator second end 376 is fixedly attached to the outer vessel wall 52. In this embodiment, each longitudinal flow separator 370 extends from the inner and outer vessel entrances, 24 and 54, to the inner and outer vessel exits, 26 and 56, along the longitudinal lengths of inner and outer vessels, 20 and 50.

The longitudinal flow separators 370 are attached along the circumferences of inner vessel 20 and outer vessel 50 so as to divide gap 80 into a plurality of arc-shaped longitudinal flow sections 372, each having a cross-sectional arc shape. Preferably, the longitudinal flow separators 370 are equally dispersed along the circumferences of inner vessel 20 and outer vessel 50 so as to divide gap 80 into a plurality of equally-dimensioned arc-shaped longitudinal flow sections 372. In one embodiment, the plurality of longitudinal flow sections 372 are sealed from each other so that the heat removal agent 90 flowing in one longitudinal flow section 372 does not pass into any other longitudinal flow section 372. In another embodiment (not shown) the plurality of longitudinal flow sections 372 are in fluid communication with each other thereby enabling the passage of heat removal agent 90 between longitudinal flow sections 372. In this embodiment, each longitudinal flow separator 370 includes a plurality of apertures (not shown) therethrough which provide direct fluid communication between either side of the corresponding longitudinal flow separators 370.

In this alternative preferred embodiment, outer vessel inflow conduit openings 58, one for each inflow conduit 30, are located at the hottest end of outer vessel 50, either outer vessel entrance 54 or outer vessel exit 56. Normally, the hottest end of the outer vessel 50 is the end proximate the burner (or other heat source). If the burner is adjacent the outer vessel entrance 54, then outer vessel inflow conduit openings 58 are located adjacent outer vessel entrance 54. If the burner is adjacent the outer vessel exit 56, then outer vessel inflow conduit openings 58 are located adjacent outer vessel exit 56. In either respect, each outer vessel inflow conduit opening 58 is in fluid communication with its corresponding inflow conduit 30. Furthermore, in this alternative preferred embodiment, outer vessel 50 includes at least one outer vessel inflow conduit opening 58 in fluid communication with each longitudinal flow section 372.

Also in this alternative preferred embodiment, outer vessel outflow conduit openings 60, one for each outflow conduit 40, are located at the end of outer vessel 50, either outer vessel entrance 54 or outer vessel exit 56, opposite outer vessel inflow conduit openings 58. If outer vessel inflow conduit openings 58 are located adjacent outer vessel entrance 54, then outer vessel outflow conduit openings 60 are located adjacent outer vessel exit 56. If outer vessel inflow conduit openings 58 are located adjacent outer vessel exit 56, then outer vessel outflow conduit openings 60 are located adjacent outer vessel entrance 54. In either respect, each outer vessel outflow conduit opening 60 is in fluid communication with its corresponding outflow conduit 40. Furthermore, in this alternative preferred embodiment, outer vessel 50 includes at least one outer vessel outflow conduit opening 60 in fluid communication with each longitudinal flow section 372.

In this alternative preferred embodiment as shown in FIG. 9, system 10 may also include a first baffle reservoir 180 serving the same function as the first baffle reservoir 180 disclosed in the previous embodiment. The only difference is that, instead of being elongate in shape and attached to the outer vessel bottom portion 57, first baffle reservoir 180 in this alternative preferred embodiment is attached to the "hottest" end of outer vessel 50 (as defined herein) and has an annular shape coinciding with the annular shape of the outer vessel 50 at the outer vessel entrance or exit, 54 or 56. By implementing a first baffle reservoir 180 in this embodiment and as disclosed in the previous embodiment, system 10 would not include outer vessel inflow conduit openings 58, but would include a plurality of outer vessel inlets 188 and a plurality of first baffle reservoir openings 190. Further, system 10 may include a plurality of first baffle separators 280 defining a plurality of first baffle reservoir sections 282.

In this alternative preferred embodiment, system 10 may also include a second baffle reservoir 191 (not shown in FIG. 9 but identical to the first baffle reservoir shown in FIG. 9) serving the same function as the second baffle reservoir 191 disclosed in the previous embodiment. The only difference is that, instead of being elongate in shape and attached to the outer vessel top portion 59, second baffle reservoir 191 in this alternative preferred embodiment is attached to the end opposite the "hottest" end of outer vessel 50 (as defined herein) and has an annular shape coinciding with the annular shape of the outer vessel 50 at the outer vessel entrance or exit, 54 or 56. By implementing a second baffle reservoir 191 in this embodiment and as disclosed in the previous embodiment, system 10 would not include outer vessel outflow conduit openings 60, but would include a plurality of outer vessel outlets 197 and a plurality of second baffle reservoir openings 196. Further, system 10 may include a plurality of second baffle separators 290 defining a plurality of second baffle reservoir sections 292.

Furthermore, the preferences in the construction, size, location, and number of the inflow and outflow conduit openings, 58 and 60, the inflow and outflow conduits, 30 and 40, and the outer vessel inlets and outlets, 188 and 197, as discussed in the previous embodiment are also preferred in this alternative preferred embodiment.

Another distinction in this alternative preferred embodiment is that the at least one helical bar 122 which comprises means for enhancing 120 is preferably attached to inner vessel wall 22 longitudinally along inner vessel 20 from inner vessel entrance 24 to inner vessel exit 26. In the preferred embodiment, at least one helical bar 122 is attached within each longitudinal flow section 372, preferably perpendicular to the direction of the flow of heat removal agent 90.

In addition, any means for spacing 140 or baffling 170 attached to the system 10 in this embodiment or any other embodiment should be attached within gap 80 so that it does not impede the longitudinal flow of heat removal agent 90 along gap 80. For example, the rod members 148 shown in FIG. 9 are attached longitudinally within gap 80 instead of transversely as was the case in the previous embodiment.

IN OPERATION

In operation, each pump 112 must first be activated. Upon activation, each pump 112 begins to pump heat removal agent 90 stored in surge tank 260. Each pump 112 suctions heat removal agent 90 from surge tank 260 through its pump inlet 114 and pumps it through its pump outlet 116 into the corresponding inflow conduits 30.

In the embodiment not including first baffle reservoir 180, heat removal agent 90 flows from the inflow conduits 30 through outer vessel inflow conduit openings 58 and into gap 80. Eventually, as more heat removal agent 90 is pumped into gap 80, heat removal agent 90 completely fills up gap 80.

In the embodiment including first baffle reservoir 180, heat removal agent 90 flows from the inflow conduits 30 through first reservoir openings 190 and into first reservoir interior 186 or into each first baffle reservoir section 282 (in the relevant embodiments). Eventually, as more heat removal agent 90 is pumped, heat removal agent 90 completely fills up first reservoir interior 186 or each first baffle reservoir section 282 (in the relevant embodiments). At this point, heat removal agent 90 begins to flow through outer vessel inlets 188 and into gap 80. It is noted that, by delaying the time it takes heat removal agent 90 to enter gap 80 and by holding a given amount of heat removal agent 90 within first baffle reservoir 180 before any enters gap 80, first baffle reservoir 180 serves to ensure the uniform distribution and rate of inflow of heat removal agent 90 through outer vessel inlets 188 and into gap 80.

Once heat removal agent 90 completely surrounds inner vessel 20, it begins to exit gap 80. In the embodiment not including second baffle reservoir 191, heat removal agent 90 exits gap 80 through outer vessel outflow conduit openings 60 and outflow conduits 40.

In the embodiment including second baffle reservoir 191, heat removal agent 90 exits gap 80 through outer vessel outlets 197. In this embodiment, after passing through outer vessel outlets 197, heat removal agent 90 enters and begins to fill second reservoir interior 194 or each second baffle reservoir section 292 (in the relevant embodiments). Once second reservoir interior 194 or each second baffle reservoir section 292 (in the relevant embodiments) is completely filled, heat removal agent 90 exits second baffle reservoir 191 through second reservoir openings 196 and outflow conduits 40. It is noted that, by delaying the time it takes heat removal agent 90 to exit second baffle reservoir 191 and by holding a given amount of heat removal agent 90 within second baffle reservoir 191 before any exits second baffle reservoir 191, second baffle reservoir 191 serves to ensure the uniform distribution and rate of outflow of heat removal agent 90 out of gap 80 through outer vessel outlets 197 and out of second baffle reservoir 191 through second reservoir openings 196.

Importantly, heat removal agent 90 is pumped into gap 80 at its initial temperature 91. Prior to the activation of the Claus unit burner, heat removal agent 90 also exits gap 80 at substantially its initial temperature 91.

The flow of heat removal agent 90 within gap 80 is governed by means for spacing 140 and means for baffling 170. In the relevant embodiments, transverse flow separators 270 (or longitudinal flow separators 370) also govern the flow of heat removal agent 90 within gap 80.

In the embodiment including transverse flow separators 270 (or longitudinal flow separators 370), because each transverse flow section 272 (or longitudinal flow section 372) is in fluid communication with at least one inflow conduit 30 (or with at least one outer vessel inlet 188 in the embodiment including first baffle reservoir 180), heat removal agent 90 is pumped separately into each transverse flow section 272 (or longitudinal flow section 372). If transverse flow separators 270 (or longitudinal flow separators 370) do not include apertures, then heat removal agent 90 flows within its respective transverse flow section 272 (or longitudinal flow section 372) and exits gap 80 through the outflow conduit 40 or outer vessel outlet 197 corresponding to that particular transverse flow section 272 (or longitudinal flow section 372). If transverse flow separators 270 (or longitudinal flow separators 370) include apertures, the heat removal agent 90 flows within its respective transverse flow sections 272 (or longitudinal flow sections 372) and may also flow through apertures to adjacent transverse flow sections 272 (or longitudinal flow sections 372).

It is understood that in the preferred embodiment including transverse flow sections 272, heat removal agent 90 flows within each transverse flow section 272 transversely around (circling) inner vessel 20. In the alternative preferred embodiment including longitudinal flow sections 372, heat removal agent 90 flows within each longitudinal flow section 372 longitudinally along inner vessel 20.

As previously disclosed, means for baffling 170 allows and directs the flow of heat removal agent 90 within gap 80 so that such flow is uniform throughout gap 80 and throughout the configuration and shape of inner vessel 20 and outer vessel 50. In the embodiment in which means for baffling 170 includes transverse flow separators 270 (or longitudinal flow separators 370), transverse flow separators 270 (or longitudinal flow separators 370) govern the flow of heat removal agent 90 as previously disclosed. In the embodiment in which means for baffling 170 comprises brackets 142, rod members 148, and/or baffle plates 172, each of said components acts to uniformly direct the flow of heat removal agent 90 within gap 80 or within each transverse flow section 272 (or longitudinal flow section 372) around (or along) inner vessel 20. If such components include apertures 174, then flow through such components is thereby allowed. In the embodiment including first baffle reservoir 180, first baffle reservoir 180 ensures a uniform flow rate into gap 80 or into each transverse flow section 272 (or longitudinal flow section 372). In the embodiment including second baffle reservoir 191, second baffle reservoir 191 ensures a uniform flow rate out of gap 80 or out of each transverse flow section 272 (or longitudinal flow section 372).

Furthermore, the equal spacing arrangement of inflow conduits 30 (and corresponding openings 58 or inlets 188) and outflow conduits 40 (and corresponding openings 60 or outlets 197) as well as their equal cross-sectional diameter sizes maximizes the amount of area of inner vessel wall 22 which contacts heat removal agent 90 at its initial temperature 91.

As heat removal agent 90 flows into and within gap 80, heat removal agent 90 generates stresses (associated with the fluid flow) on inner vessel wall 22. The existence of these stresses mandates that either [1] the inner vessel wall 22 be thick enough to withstand the stresses or [2] the stresses be somehow adequately reacted. A thicker inner vessel wall 22 leads to a lower heat transfer rate between inner vessel wall 22 and heat removal agent 90. Because a high heat transfer rate is desired, it is preferable to adequately react the stresses on inner vessel wall 22.

Means for spacing 140 (including transverse or longitudinal flow separators 270 or 370, brackets 142, and/or rod members 148) adequately reacts the stresses associated with flow of heat removal agent 90 on inner vessel wall 22. In effect and because means for spacing 140 is attached to inner vessel 20 and outer vessel 50, the stresses created on inner vessel wall 22 are transferred through means for spacing 140 to outer vessel 50. By thus reacting the stresses, it is possible to maintain the thickness of inner vessel wall 22 relatively small.

Once gap 80 is completely filled with heat removal agent 90, an operator may activate the burner of the Claus unit or inner vessel 20. As previously disclosed, once activated, the temperatures in the interior of the inner vessel 20 reach extremely high levels. As the temperature in the interior of the inner vessel 20 increases, convective heat transfer acts to also raise the temperature of the inner vessel wall 22. For reasons previously disclosed, it is critical to maintain the temperature of the inner vessel wall 22 at adequate and safe levels.

The initial temperature 91 of the heat removal agent 90 is approximately 200° F. to 300° F. The normal operating temperature in the interior of the inner vessel 20 is approximately 2700° F. to 3000° F. The difference in temperature between the initial temperature 91 of heat removal agent 90 and the operating interior temperature of inner vessel 20 is so large that, as the heat removal agent 90 comes into contact with inner vessel wall 22 within gap 80, an extensive and efficient conductive heat transfer occurs between the inner vessel wall 22 and the heat removal agent 90.

Essentially, heat is transferred from the relatively higher temperature inner vessel wall 22 to the relatively lower temperature heat removal agent 90. And, since heat removal agent 90 possesses a high heat transfer coefficient, the heat transfer between heat removal agent 90 and inner vessel wall 22 is efficient and extensive. Thus, inner vessel wall 22 is cooled to adequate and safe temperatures, and heat removal agent 90 absorbs heat from inner vessel wall 22 thereby increasing in temperature. Heat removal agent 90, after coming in contact with and cooling inner vessel wall 22, exits gap 80 at exit temperature 92, approximately 400° F. to 600° F.

In the preferred embodiment including flow regulators 250, it is noted that the flow rate through each inflow conduit 30 can be adjusted (to be either increased or decreased) by adjusting each variable flow valve 252. As previously disclosed, it is preferred that the embodiment including transverse flow sections 272 (or longitudinal flow sections 372) also include flow regulators 250. Thus, the flow rates within each transverse flow section 272 (or longitudinal flow section 373) can be adjusted to differ. With this capability, in the embodiment including transverse flow sections 272, the flow rate within the transverse flow section 272 proximate or adjacent to the burner of a Claus unit (or the hottest section of an inner vessel 20) can be increased so that heat removal agent 90 flowing therethrough can adequately remove the extra heat present in that section of inner vessel 20. Furthermore, in the alternative preferred embodiment including longitudinal flow sections 372, because the inflow conduits 30 feed the "hottest" end of outer vessel 50 (as defined herein), heat removal agent 90 enters the hottest portion of gap 80 at its coolest and initial temperature 91. Thus, system 10 in this embodiment is able to distribute heat removal agent 90 at its coolest temperature (having the most potential to generate a substantial heat transfer) to the portion of gap 80 and inner vessel wall 22 which requires the greatest amount of cooling.

In the embodiment including means for enhancing heat transfer 120, means for enhancing heat transfer 120 enhances the efficiency and rate of heat transferred from inner vessel wall 22 to heat removal agent 90. In the embodiment in which means for enhancing heat transfer 120 comprises one or more helical bars 122, heat removal agent 90 flows within gap 80 along the length of each helical bar 122. Since each helical bar 122 is twisted into a helical shape, heat removal agent 90 generally follows a spiral motion as it flows along the length of each helical bar 122. The general spiral motion created by the helical shape in turns creates vortices and turbulent flow of heat removal agent 90 along inner vessel wall 22. The turbulent flow of heat removal agent 90 created by helical bar(s) 122 greatly enhances the efficiency and the rate of heat transfer from the relatively hotter inner vessel wall 22 to the relatively cooler heat removal agent 90. As more helical bars 122 are added to inner vessel 20 thereby creating more turbulent flow, the enhancement of heat transfer provided by such turbulent flow increases.

In the embodiment including heat recovery cycle 200, after heat removal agent 90 exits gap 80, it flows out of outer vessel outflow conduit openings 60 (or second reservoir opening 196 in the embodiment including second baffle reservoir 191) through outflow conduits 40 and into first piping 202. Within first piping 202, heat removal agent 90 flows into heat utilization stage 220. As previously disclosed, the specific structure and function of heat utilization stage 220 is dependent upon the requirements and desires of the operator. Nevertheless, regardless of structure, heat utilization stage 220 uses the heat possessed by the heat removal agent 90 at its exit temperature 92 to perform work or to transfer heat to a relatively cooler material or fluid. Thus, after exiting heat utilization stage 220, the temperature of heat removal agent 90 is less than the exit temperature 92.

However, after exiting heat utilization stage 220, the temperature of heat removal agent 90 is not at initial temperature 91, the temperature required for injection into gap 80. Thus, after exiting heat utilization stage 220, heat removal agent 90 must be cooled further. Heat removal agent 90 then flows through second piping 204 into cooling stage 240.

At cooling stage 240, the temperature of heat removal agent 90 is cooled to its initial temperature 91. As previously disclosed, the specific structure and function of cooling stage 240 is dependent upon the requirements and desires of the operator.

After exiting cooling stage 240, heat removal agent 90 flows through third piping 206 into surge tank 260. Heat removal agent 90 is stored within surge tank 260 at its initial temperature 92 and is ready to be pumped back into gap 80.

Eventually, means for pumping 110 will once again suction the heat removal agent 90 through its pump inlet 114 and pump it through its pump outlet 116 into gap 80.

Although the description and the Figures herein have primarily referred to Claus units, its is understood that the system 10 and corresponding heat recovery cycle 200 may be utilized with any inner vessel 20, regardless of its shape.

Functionally operating the system 10 described herein comprises a method for cooling an inner vessel that is exposed to high temperatures within its interior. The steps of the method, include:

(1) providing an outer vessel surrounding said inner vessel with a gap defined therebetween;

(2) pumping a liquid heat removal agent into and out of said gap; and (3) enhancing the heat transfer rate from said relatively hotter inner vessel to said relatively cooler heat removal agent by creating turbulent flow in said heat removal agent proximate said inner vessel. It is understood that the method may be further described by functionally applying the other structures defined and described herein.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A system for cooling an inner vessel that is exposed to high temperatures within its interior, comprising:

an outer vessel surrounding said inner vessel;

a means for spacing said outer vessel from said inner vessel thereby defining and maintaining a gap intermediate said outer vessel and said inner vessel;

a means for pumping a liquid heat removal agent into and out of said gap;

a means for enhancing the rate of heat transfer from relatively hotter said inner vessel to relatively cooler said heat removal agent through the creation of turbulent flow in said heat removal agent proximate said inner vessel;

said means for enhancing comprising at least one helical bar;

each of said at least one helical bar twisted along its longitudinal axis thereby providing it with its helical shape;

each of said at least one helical bar attached to said inner vessel within said gap; and wherein, as said heat removal agent flows within said gap, said heat removal agent flows along the length of said at least one helical bar and is induced by said helical shape to flow in a spiral motion thereby creating vortices and turbulent flow proximate said inner vessel.

2. A system as in claim 1, wherein:

said inner vessel comprising a cylindrical vessel designed for industrial use of the Claus method of obtaining elemental sulfur by the partial oxidation of gaseous hydrogen sulfide in the air or oxygen.

3. A system as in claim 2, wherein:

said at least one helical bar comprising a plurality of helical bars; and said plurality of helical bars attached to said inner vessel so that each of said plurality of helical bars is perpendicular to the flow direction of said heat removal agent within said gap.

4. A system for cooling an inner vessel that is exposed to high temperatures within its interior, comprising:

an outer vessel surrounding said inner vessel;

a means for spacing said outer vessel from said inner vessel thereby defining and maintaining a gap intermediate said outer vessel and said inner vessel;

a means for pumping a liquid heat removal agent into and out of said gap;

a means for enhancing the rate of heat transfer from relatively hotter said inner vessel to relatively cooler said heat removal agent;

said means for enhancing the rate of heat transfer comprising a plurality of transverse flow separators dividing said gap into a plurality of transverse flow sections;

each of said plurality of transverse flow separators sealingly attached to said inner vessel and to said outer vessel;

each of said plurality of transverse flow separators extending along the entire circumference of said inner vessel thereby completely encircling said inner vessel; and said means for pumping pumping said heat removal agent into and out of each of said plurality of transverse flow sections.

5. A system as in claim 4, further comprising:

at least one inflow conduit; and at least one of said at least one inflow conduit providing fluid communication between said means for pumping and each of said plurality of transverse flow sections.

6. A system as in claim 4, further comprising:

a means for baffling the flow of said heat removal agent within said gap;

said means for baffling comprising a first baffle reservoir and second baffle reservoir sealingly attached to said outer vessel;

said first baffle reservoir defining a first reservoir interior therein;

said second baffle reservoir defining a second reservoir interior therein;

each of said plurality of transverse flow sections in fluid communication with said first reservoir interior and with said second reservoir interior; and said means for pumping pumping said heat removal agent into said first reservoir interior, through each of said plurality of transverse flow sections, and into said second reservoir interior.

7. A system as in claim 6, further comprising:

a plurality of longitudinal flow separators dividing said gap into a plurality of longitudinal flow sections;

each of said plurality of longitudinal flow separators sealingly attached to said inner vessel and to said outer vessel;

each of said plurality of longitudinal flow separators extending along the longitudinal length of said inner vessel;

each of said plurality of longitudinal flow sections in fluid communication with said first reservoir interior and with said second reservoir interior; and said means for pumping pumping said heat removal agent into said first reservoir interior, through each of said plurality of longitudinal flow sections, and into said second reservoir interior.

8. A system as in claim 4, wherein:

said inner vessel comprising a cylindrical vessel designed for industrial use of the Claus method of obtaining elemental sulfur by the partial oxidation of gaseous hydrogen sulfide in the air or oxygen.

9. A system for cooling an inner vessel that is exposed to high temperatures within its interior, comprising:

an outer vessel surrounding said inner vessel;

a means for spacing said outer vessel from said inner vessel thereby defining and maintaining a gap intermediate said outer vessel and said inner vessel;

a means for pumping a liquid heat removal agent into and out of said gap;

a means for enhancing the rate of heat transfer from relatively hotter said inner vessel to relatively cooler said heat removal agent;

said means for enhancing enhancing said heat transfer rate by creating turbulent flow in said heat removal agent proximate said inner vessel;

said means for enhancing the rate of heat transfer comprising a plurality of longitudinal flow separators dividing said gap into a plurality of longitudinal flow sections;

each of said plurality of longitudinal flow separators sealingly attached to said inner vessel and to said outer vessel;

each of said plurality of longitudinal flow separators extending along the longitudinal length of said inner vessel; and said means for pumping pumping said heat removal agent into and out of each of said plurality of longitudinal flow sections.

10. A system as in claim 9, further comprising:

at least one inflow conduit; and at least one of said at least one inflow conduit providing fluid communication between said means for pumping and each of said plurality of longitudinal flow sections.

11. A system as in claim 10, wherein:

said inner vessel being cylindrical in shape;

each of said at least one inflow conduit connected to said inner vessel end thereby providing fluid communication between said means for pumping and each of said plurality of said longitudinal flow sections at said inner vessel end;

so that said heat removal agent flows within each of said plurality of longitudinal flow sections longitudinally along said inner vessel.

12. A system as in claim 9, wherein:

said inner vessel comprising a cylindrical vessel designed for industrial use of the Claus method of obtaining elemental sulfur by the partial oxidation of gaseous hydrogen sulfide in the air or oxygen.

13. A system for cooling an inner vessel that is exposed to high temperatures within its interior, comprising:

an outer vessel surrounding said inner vessel;

a means for spacing said outer vessel from said inner vessel thereby defining and maintaining a gap intermediate said outer vessel and said inner vessel;

a means for pumping a liquid heat removal agent into and out of said gap;

a plurality of transverse flow separators dividing said gap into a plurality of transverse flow sections;

each of said plurality of transverse flow separators sealingly attached to said inner vessel and to said outer vessel;

each of said plurality of transverse flow separators extending along the entire circumference of said inner vessel thereby completely encircling said inner vessel; and said means for pumping pumping said heat removal agent into and out of each of said plurality of transverse flow sections.

14. A system as in claim 13, further comprising:

at least one inflow conduit;

at least one of said at least one inflow conduit providing fluid communication between said means for pumping and each of said plurality of transverse flow sections;

a flow regulator functionally attached to each of said at least one inflow conduit; and each of said flow regulators capable of adjusting the flow rate of said heat removal agent flowing through said functionally attached inflow conduit.

15. A system as in claim 13, wherein:

said inner vessel comprising a cylindrical vessel designed for industrial use of the Claus method of obtaining elemental sulfur by the partial oxidation of gaseous hydrogen sulfide in the air or oxygen.

16. A system for cooling an inner vessel that is exposed to high temperatures within its interior, comprising:

an outer vessel surrounding said inner vessel;

a means for spacing said outer vessel from said inner vessel thereby defining and maintaining a gap intermediate said outer vessel and said inner vessel;

a means for pumping a liquid heat removal agent into and out of said gap;

a plurality of longitudinal flow separators dividing said gap into a plurality of longitudinal flow sections;

each of said plurality of longitudinal flow separators sealingly attached to said inner vessel and to said outer vessel;

each of said plurality of longitudinal flow separators extending along the longitudinal length of said inner vessel; and said means for pumping pumping said heat removal agent into and out of each of said plurality of longitudinal flow sections.

17. A system as in claim 16, further comprising:

at least one inflow conduit;

at least one of said at least one inflow conduit providing fluid communication between said means for pumping and each of said plurality of longitudinal flow sections;

said inner vessel being cylindrical in shape and having an end proximate a heat source;

each of said at least one inflow conduit connected to said inner vessel end thereby providing fluid communication between said means for pumping and each of said plurality of said longitudinal flow sections at said inner vessel end;

so that said heat removal agent flows within each of said plurality of longitudinal flow sections longitudinally along said inner vessel.

18. A system as in claim 16, wherein:

said inner vessel comprising a cylindrical vessel designed for industrial use of the Claus method of obtaining elemental sulfur by the partial oxidation of gaseous hydrogen sulfide in the air or oxygen.

* * * * *